US012217763B2

(12) United States Patent
Taleb et al.

(10) Patent No.: US 12,217,763 B2
(45) Date of Patent: *Feb. 4, 2025

(54) TRANSIENT DETECTION WITH HANGOVER INDICATOR FOR ENCODING AN AUDIO SIGNAL

(71) Applicant: Telefonaktiebolaget LM Ericsson (publ), Stockholm (SE)

(72) Inventors: Anisse Taleb, Kista (SE); Gustaf Ullberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,142

(22) Filed: Oct. 17, 2023

(65) Prior Publication Data

US 2024/0119951 A1 Apr. 11, 2024

Related U.S. Application Data

(63) Continuation of application No. 16/386,863, filed on Apr. 17, 2019, now Pat. No. 11,830,506, which is a continuation of application No. 15/296,600, filed on Oct. 18, 2016, now Pat. No. 10,311,883, which is a continuation of application No. 12/673,862, filed as (Continued)

(51) Int. Cl.

*G10L 19/025* (2013.01)
*G10L 19/02* (2013.01)
*G10L 19/022* (2013.01)
*G10L 25/21* (2013.01)

(52) U.S. Cl.

CPC ........ *G10L 19/025* (2013.01); *G10L 19/0212* (2013.01)

(58) Field of Classification Search

CPC ... G10L 19/02; G10L 19/0204; G10L 19/022; G10L 19/025; G10L 25/03; G10L 25/18; G10L 25/21

USPC ....... 704/201, 205, 210, 226, 227, 500, 501, 704/206

See application file for complete search history.

(56) References Cited

U.S. PATENT DOCUMENTS 3,771,167 A * 11/1973 Ross ........................ F27D 19/00
5,978,761 A 11/1999 Johansson (Continued)

FOREIGN PATENT DOCUMENTS

JP 2001127641 5/2001
JP 2006201375 8/2006

(Continued)

OTHER PUBLICATIONS

Office Action issued in corresponding Japanese application No. 2013-030367 dated Dec. 6, 2013, 2 pages.

(Continued)

*Primary Examiner* — Martin Lerner
(74) *Attorney, Agent, or Firm* — Rothwell, Figg, Ernst & Manbeck, P.C.

(57) ABSTRACT

A transient detector analyzes a given frame n of the input audio signal to determine, based on audio signal characteristics of the given frame n, a transient hangover indicator for a following frame n+1, and signals the determined transient hangover indicator to an associated audio encoder to enable proper encoding of the following frame n+1.

17 Claims, 12 Drawing Sheets

Related U.S. Application Data application No. PCT/SE2008/050960 on Aug. 25, 2008, now Pat. No. 9,495,971.

(60) Provisional application No. 60/968,229, filed on Aug. 27, 2007.

(56) References Cited

U.S. PATENT DOCUMENTS

| | | | | |
|---|---|---|---|---|
| 5,991,718 | A | 11/1999 | Malah | |
| 6,078,882 | A | 6/2000 | Sato et al. | |
| 6,202,046 | B1 | 3/2001 | Oshikiri | |
| 6,597,961 | B1 | 7/2003 | Cooke | |
| 6,615,169 | B1 | 9/2003 | Ojala et al. | |
| 6,704,705 | B1 | 3/2004 | Kabal et al. | |
| 6,775,650 | B1 | 8/2004 | Lockwood | |
| 6,889,187 | B2 | 5/2005 | Zhang | |
| 7,328,150 | B2 | 2/2008 | Chen et al. | |
| 7,937,271 | B2 | 5/2011 | You | |
| 8,392,202 | B2 | 3/2013 | Taleb | |
| 8,744,862 | B2 | 6/2014 | You | |
| 9,153,240 | B2 | 10/2015 | Briand et al. | |
| 9,495,971 | B2 | 11/2016 | Ullberg et al. | |
| 9,558,750 | B2 | 1/2017 | Sung et al. | |
| 10,096,324 | B2 | 10/2018 | Sung et al. | |
| 10,311,883 | B2 | 6/2019 | Taleb | |
| 11,830,506 | B2 * | 11/2023 | Taleb | G10L 19/0212 |
| 2002/0103643 | A1 | 8/2002 | Rotola-Pukkila | |
| 2002/0111798 | A1 | 8/2002 | Huang | |
| 2002/0133764 | A1 | 9/2002 | Wang | |
| 2003/0115052 | A1 | 6/2003 | Chen | |
| 2004/0044520 | A1 | 3/2004 | Chen | |
| 2004/0044534 | A1 | 3/2004 | Chen | |
| 2004/0088160 | A1 | 5/2004 | Manu | |
| 2004/0133423 | A1 | 7/2004 | Crockett | |
| 2005/0075861 | A1 | 4/2005 | Youn | |
| 2005/0131678 | A1 | 6/2005 | Chandran | |
| 2006/0031065 | A1 | 2/2006 | Liljeryd et al. | |
| 2006/0116873 | A1 | 6/2006 | Hetherington et al. | |
| 2006/0161427 | A1 | 7/2006 | Ojala | |
| 2007/0016405 | A1 | 1/2007 | Mehrotra | |
| 2007/0061138 | A1 | 3/2007 | Chen | |
| 2007/0078650 | A1 | 4/2007 | Rogers | |
| 2007/0140499 | A1 | 6/2007 | Davis | |
| 2007/0242833 | A1 | 10/2007 | Herre et al. | |
| 2008/0024207 | A1 | 1/2008 | Baker | |
| 2008/0027717 | A1 | 1/2008 | Rajendran et al. | |
| 2008/0059202 | A1 | 3/2008 | You | |
| 2008/0120116 | A1 | 5/2008 | Schnell et al. | |
| 2010/0250265 | A1 | 9/2010 | Taleb | |
| 2012/0128162 | A1 | 5/2012 | Chen et al. | |
| 2014/0257824 | A1 | 9/2014 | Taleb et al. | |
| 2015/0142452 | A1 | 5/2015 | Sung et al. | |
| 2017/0140762 | A1 | 5/2017 | Sung et al. | |

FOREIGN PATENT DOCUMENTS

| | | |
|---|---|---|
| WO | 2000019414 | 4/2000 |
| WO | 2000045389 | 8/2000 |
| WO | 2008022566 | 2/2008 |
| WO | 2009029033 | 3/2009 |

OTHER PUBLICATIONS

Bosi et al., "Description and Complexity Estimation of the NBC Advanced Blockswitching Scheme (ABS)," International Organization for Standardization ISO/IEC JTC1/SC29/WG11 Coding of Moving Pictures and Associated Audio, MPEG Meeting 96/1114, Tampere, Jul. 1996, XP030030508, 8 pages.

ITU-T Draft, "G.722.1 extension for 20 KHz fullband audio," Draft new ITU-T Recommendation G.722.1-FB, Study Period 2005-2008, International Telecommunication Union, Study Group 16, Apr. 29, 2008, XP017543692, 44 pages.

Extended European Search Report issued in corresponding European Patent Application No. 08828880.8, dated Nov. 27, 2013, 3 pages.

European Result of consutation cited in EP 08 828 880.8 dated May 9, 2016, 8 pages.

Summons to attend oral proceedings pursuant to Rule 115(1) EPC issued in European Application 08828880.8-1901/2186090 dated Sep. 22, 2015, 7 pages.

Response to examination report issued in European Patent Application No. 08828880.08-1907 dated Mar. 26, 2015, 4 pages.

Office Action issued in corresponding Japanese Application No. 2010-522866 dated Oct. 22, 2012, 2 pages.

Decision of Refusal dated Dec. 8, 2014 in corresponding Japanese Patent Application No. 2013-030367, 3 pages.

Requisition by the Examiner cited in Canadian Application No. 2,697,920 dated Apr. 30, 2014, 4 pages.

Requisition by the Examiner cited in Canadian Application No. 2,697,920 dated May 26, 2015, 4 pages.

First Office Action cited in Chinese Patent Application No. 200880104833.5 dated Sep. 26, 2011, 8 pages.

European extended Search Report cited in EP 08828880.08-1907 dated Nov. 27, 2013, 7 pages.

Communication pursuant to Article 94(3) EPC cited in 08 828 880.08-1907 dated Sep. 17, 2014, 5 pages.

M. Bosi et al., "IS 13818-7 (MPEG-2 Advanced Audio Coding, AAC)", International Organization for Standardization Organisation Internationale de Normalisation ISO/IEC JTC1/SC29/WG11 Coding of Moving Pictures and Audio, ISO/IEC 13818-7:1997(E), Apr. 1997, 107 pages.

Information Technology—Generic Coding of Moving Pictures and Associated Audio: Systems Recommendation H.222.0,International Organization for Standardization Organisation Internationale de Normalisation ISO/IEC JTC1/SC29/WG11 Coding of Moving Pictures and Audio, ISO/IEC 13818-1, Nov. 13, 1994, 161 pages.

Office action issued for Canadian Patent Application No. 2,697,920, dated May 25, 2016, 4 pages.

Taleb et al., "G.719: The First ITU-T Standard for High-Quality Conversational Fullband Audio Coding", IEEE Communications Magazine, Oct. 2009, pp. 124-130.

International Search Report and Written Opinion dated Nov. 24, 2008 in International application No. PCT/SE2008/050960, 9 pages.

* cited by examiner

100

TRANSIENT DETECTION WITH HANGOVER INDICATOR FOR ENCODING AN AUDIO SIGNAL

CROSS-REFERENCE TO RELATED APPLICATIONS

This application is a continuation of U.S. application Ser. No. 16/386,863, filed on 2019 Apr. 17 (now U.S. Pat. No. 11,830,506, issued on 2023 Nov. 28), which is a continuation of U.S. application Ser. No. 15/296,600, filed on 2016 Oct. 18 (now U.S. Pat. No. 10,311,883, issued on 2019 Jun. 4), which is a continuation of U.S. application Ser. No. 12/673,862 (now U.S. Pat. No. 9,495,971, issued on 2016 Nov. 15), which has a § 371 (c) date of 2010 Aug. 12 and which is the National Stage of International Patent Application No. PCT/SE2008/050960, filed 2008 Aug. 25, which claims priority to U.S. Provisional Application No. 60/968,229, filed 2007 Aug. 27. The above identified applications and publications are incorporated by this reference.

TECHNICAL FIELD

The present invention relates to a transient detector operating on an audio signal, and a method for supporting encoding of an audio signal.

BACKGROUND

An encoder is a device, circuitry or computer program that is capable of analyzing a signal such as an audio signal and outputting a signal in an encoded form. The resulting signal is often used for transmission, storage and/or encryption purposes. On the other hand a decoder is a device, circuitry or computer program that is capable of inverting the encoder operation, in that it receives the encoded signal and outputs a decoded signal.

In most state-of the art encoders such as audio encoders, each frame of the input signal is analyzed in the frequency domain. The result of this analysis is quantized and encoded and then transmitted or stored depending on the application. At the receiving side (or when using the stored encoded signal) a corresponding decoding procedure followed by a synthesis procedure makes it possible to restore the signal in the time domain.

Codecs are often employed for compression/decompression of information such as audio and video data for efficient transmission over bandwidth-limited communication channels.

In particular, there is a high market need to transmit and store audio signals at low bit rates while maintaining high audio quality. For example, in cases where transmission resources or storage is limited low bit rate operation is an essential cost factor. This is typically the case, for example, in streaming and messaging applications in mobile communication systems.

A general example of an audio transmission system using audio encoding and decoding is schematically illustrated in FIG. 1. The overall system basically comprises an audio encoder 10 and a transmission module (TX) 20 on the transmitting side, and a receiving module (RX) 30 and an audio decoder 40 on the receiving side.

An audio signal can be considered quasi-stationary, i.e. stationary for short time periods. For example, a transform-based audio codec divides the signal into short time periods, frames, and relies on the quasi-stationarity to achieve efficient compression.

The audio signal may contain a number of rapid changes in frequency spectrum or amplitude, so called transients. It is desirable to detect these transients such that the audio codec can take proper actions to avoid the audible artifacts that transients may cause in for example transform-based audio codecs (for example the pre-echo effect; i.e. quantization noise spread in time).

For this reason a transient detector is used in connection with the audio codec. The transient detector analyzes the audio signal and is responsible for signaling detected transients to the encoder. There are transient detectors operating in the time-domain as well as transient detectors operating in the frequency-domain.

For example, a transient detector is commonly included into audio codecs as the input to the window switching module [1, 2].

SUMMARY

However, there is a general demand for more efficient audio encoding and improved mechanisms and realizations for supporting audio encoding including transient detectors.

It is a general object of the present invention to provide an improved transient detector operating on an audio signal.

It is also an object to provide a method for supporting encoding of an audio signal.

These and other objects are met by the invention as defined by the accompanying patent claims.

The inventors have recognized that when transient detection is performed in the time domain and the codec operates based on a lapped transform, a transient in a given frame will also affect the encoding of a following frame. A basic idea of the invention is therefore to provide a transient detector which analyzes a given frame n of the input audio signal to determine, based on audio signal characteristics of the given frame n, a transient hangover indicator for a following frame n+1, and signals the determined transient hangover indicator to an associated audio encoder to enable proper encoding of the following frame n+1.

Preferably, when the audio signal characteristics of frame n includes characteristics representative of a transient the transient detector determines a transient hangover indicator indicating a transient for the following frame n+1.

In practice, it is thus possible to configure the transient detector in such a way that if a transient is detected and signaled to the codec for a current frame, the transient detector will also signal a transient hangover that is relevant for the following frame.

In this way it can be ensured that proper encoding actions are taken, when the codec operates based on a lapped transform, also for the following frame.

The invention covers both a transient detector and a method for supporting encoding of an audio signal.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
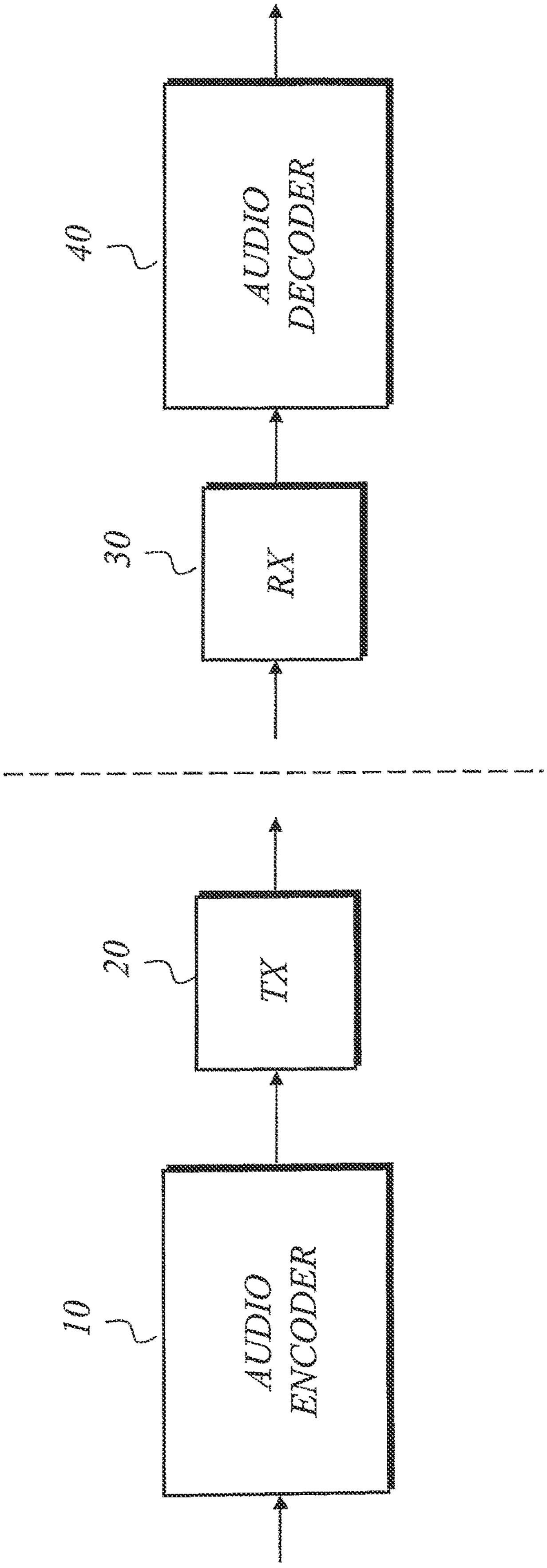
Fig. 1 (Prior Art)
FIG. 1 is a schematic block diagram illustrating a general example of an audio transmission system using audio encoding and decoding.

Throughout the drawings, the same reference characters will be used for corresponding or similar elements.

As previously mentioned, it is desirable to detect transients in an audio signal such that the audio codec can take proper actions to avoid the audible artifacts that transients may cause in for example transform-based audio codecs (e.g. the pre-echo effect) and more generally audio encoders operating based on a lapped transform. Pre-echoes generally occur when a signal with a sharp attack begins near the end of a transform block immediately following a region of low energy. In general, a transient is characterized by a sudden change in audio signal characteristics such as amplitude and/or power measured in the time and/or frequency domain. Preferably, the audio encoder is configured to perform transform-based encoding especially adapted for transients (transient encoding mode) when a transient is detected for an input frame. There are a number of different conventional strategies for encoding transients.

However, the inventors have recognized that when transient detection is performed in the time domain and the codec operates based on a lapped transform, a transient in a given frame will also affect the encoding of a following frame. Based on this insight into the operation of a lapped transform codec, a novel transient detector is introduced.

Figure 2:
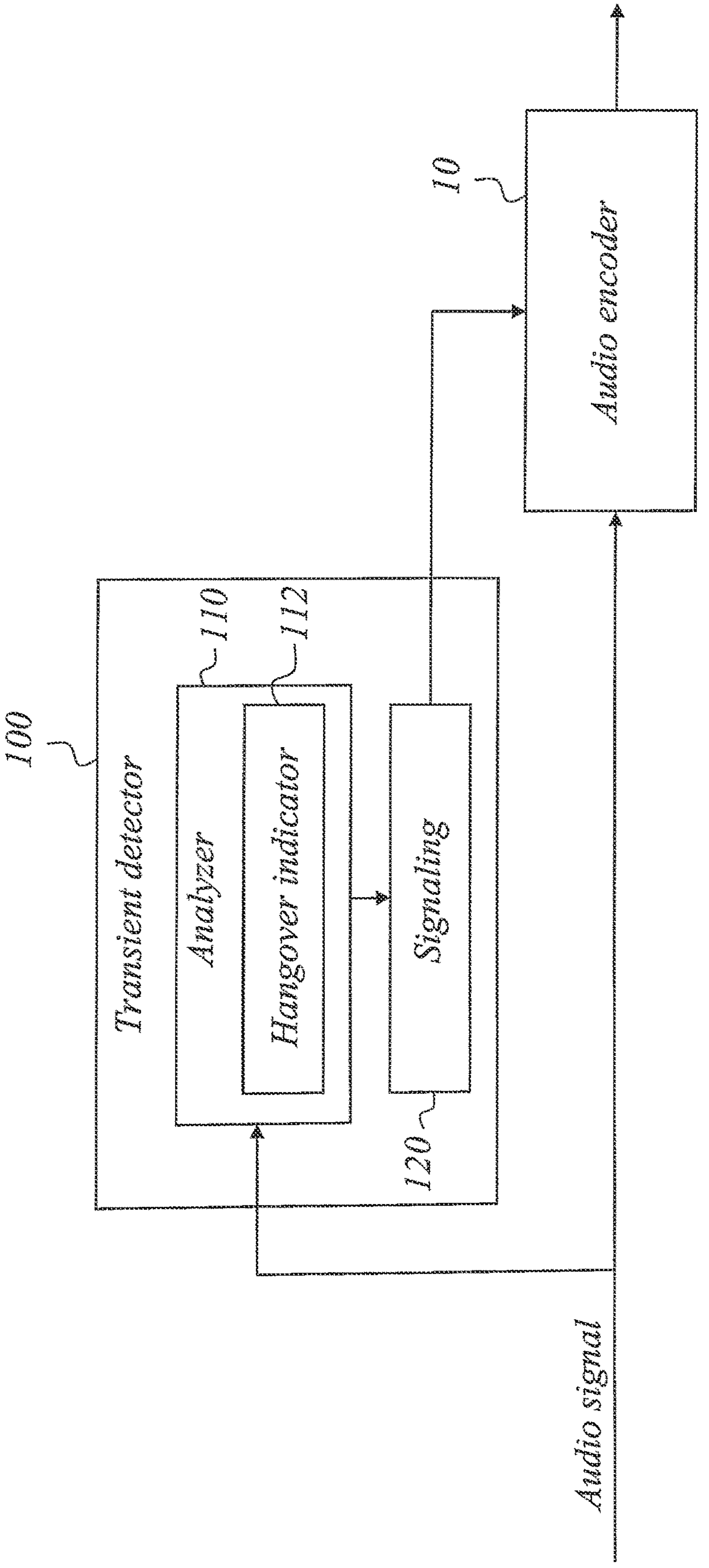
FIG. 2 is a schematic block diagram illustrating a novel transient detector in association with an audio encoder according to an exemplary embodiment of the invention.

FIG. 2 is a schematic block diagram illustrating a novel transient detector in association with an audio encoder according to an exemplary embodiment of the invention. The transient detector 100 of FIG. 2 basically includes an analyzer 110 and a signaling module 120. The audio signal to be encoded by an associated audio encoder 10 is also transferred as input to the transient detector 100. Normally, the transient detector is operable for detecting a transient in a current input frame of the audio signal and signaling the transient to the audio encoder for proper encoding of the current frame. In this example, the audio encoder 10 is preferably a transform-based encoder using a lapped transform.

The analyzer 110 performs suitable signal analysis based on the received audio signal. Preferable, the transient detector 100 analyzes a given frame n, a transient hangover indicator for a following frame n+1 in a novel hangover indicator module 112 of the analyzer 110. The signaling module 120 is operable for signaling the determined transient hangover indicator to the associated audio encoder 10 to enable proper encoding of the following frame n+1. Any suitable transient detection measure may be used such as a short-to-long-term-energy-ratio.

It is thus possible for the transient detector 100 to signal not only a transient for the current frame n, but also a transient hangover indicator for a following frame n+1 based on an analysis of the current frame n.

Figure 3A:
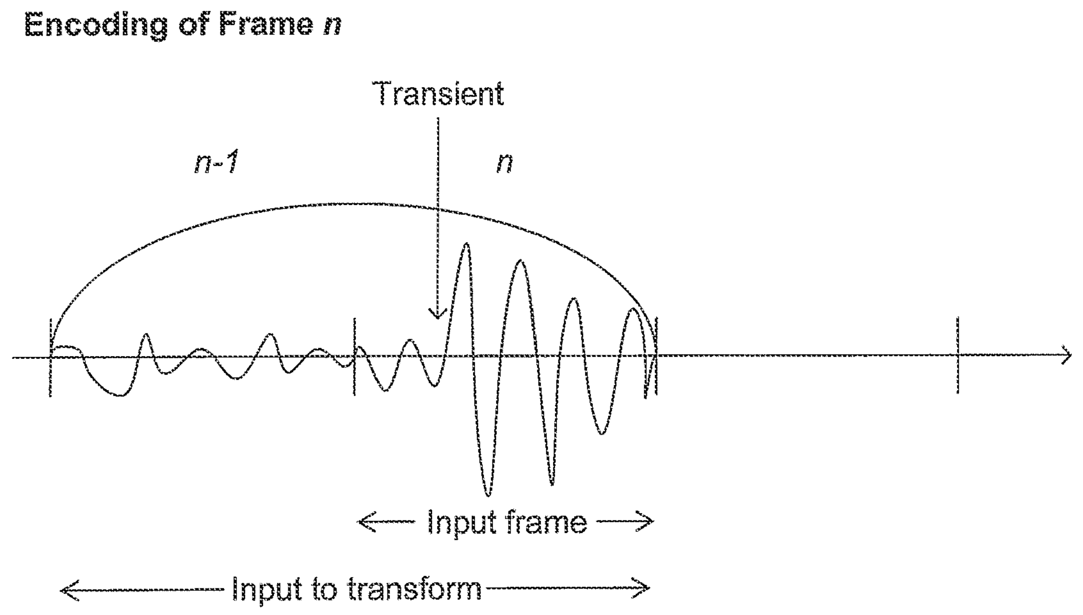
FIGS. 3A-B are schematic diagrams illustrating how a transient in a given input frame n may affect the encoding of a following frame.
Figure 3B:
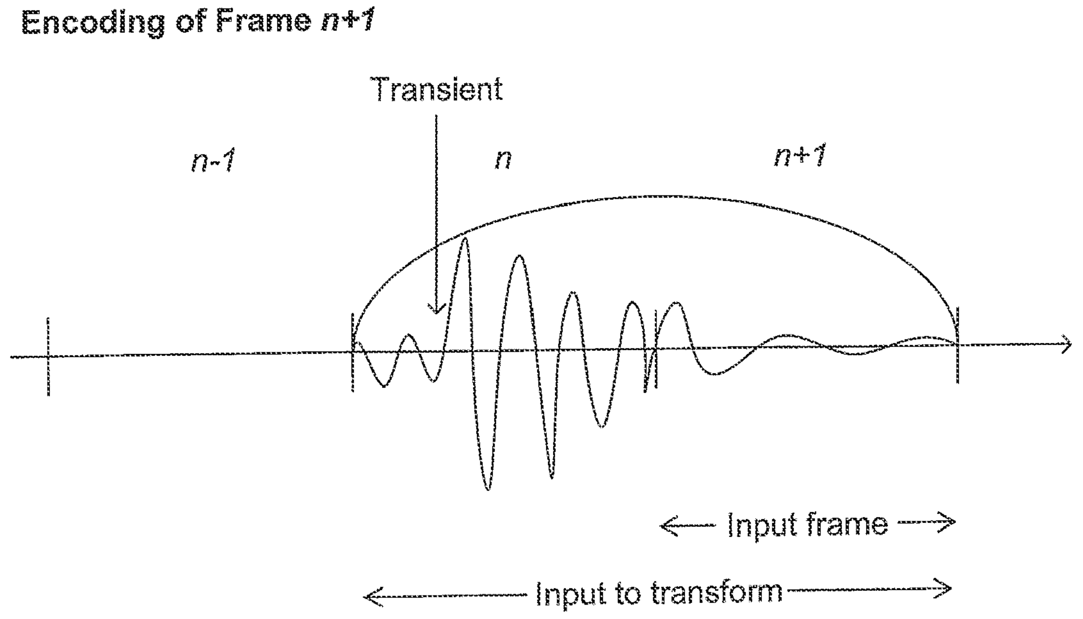

As illustrated in FIGS. 3A-B, a transient in a given input frame may affect the encoding of a following frame when the encoder operates based on a lapped transform.

For example, transform-based audio encoders are normally built around a time-to-frequency domain transform such as a DCT (Discrete Cosine Transform), a Modified Discrete Cosine Transform (MDCT) or a lapped transform other than the MDCT. A common characteristic of transform-based audio encoders is that they operate on overlapped blocks of samples: overlapped frames.

FIGS. 3A-B illustrate input frames of an audio signal, and also the so-called overlapped frames used as input to the audio encoder.

In FIG. 3A, two consecutive audio input frames, frame n−1 and frame n are shown. The input for transform-based audio encoding in relation to input frame n is formed by the frames n and n−1. In this example, the input frame n includes a transient, and the input for transform-based audio encoding will naturally also include the transient.

In FIG. 3B, two consecutive audio input frames, frame n and frame n+1 are shown. The input for transform-based audio encoding in relation to the input frame n+1 is formed by the frames n and n+1. As can be seen from FIG. 3B, the transient in frame n will also be present in the input to the transform for encoding in relation to frame n+1.

It should be noted that the input to the transform for encoding frame n and the input to the transform for encoding frame n+1 are overlapping. Hence, the reason for referring to these larger transform input blocks as overlapped frames.

If transient detection is performed in time domain and the codec operates with lapped transforms, such as the Modified Discrete Cosine Transform (MDCT), a transient in the input frame will also appear in the following frame.

Since the transient is encoded not only in the frame where it is detected, but also in the following frame, it is suggested to introduce a hangover in the transient detector. The hangover implies that if a transient is detected and signalled to the codec for the current frame, then the transient detector shall also signal to the codec that a transient is detected in the following frame.

In this way it can be ensured that proper encoding actions are taken also for the following frame. When a hangover indicator indicating a transient is signaled from the signaling module 120 of the transient detector 100 to the audio encoder 10, the encoder 10 performs so-called transient encoding of frame n+1; i.e. using a so-called transient encoding mode adapted for encoding of an overlapped frame block that includes a transient.

Proper encoding actions in so-called transient encoding mode could for instance be to decrease the length of the transform to improve the time resolution at the cost of a worse frequency resolution. This may for example be effectuated by performing time-domain aliasing (TDA) based on an overlapped frame to generate a corresponding time-domain aliased frame, and perform segmentation in time based on the time-domain aliased frame to generate at least two segments, also referred to as sub-frames. Based on these segments, transform-based spectral analysis may then be performed to obtain, for each segment, coefficients representative of the frequency content of the segment.

It should be understood that even if no transient is detected by the transient detector 100 based on the audio signal characteristics of input frame n+1 (see FIG. 3B), a transient hangover indication may anyway be signaled to the audio encoder 10 based on the hangover originating from a transient detected in frame n. This runs counter to 5 the predominant trend in the prior art of relying solely on the conventional transient detection based on the audio signal characteristics of the most recent input frame under consideration by the transient detector. With a transient detector according to the prior art, no transient will be detected for frame n+1 (FIG. 3B) and hence the associated audio encoder will not use a transient encoding mode, resulting in audible artifacts such as annoying pre-echo.

Figure 4:
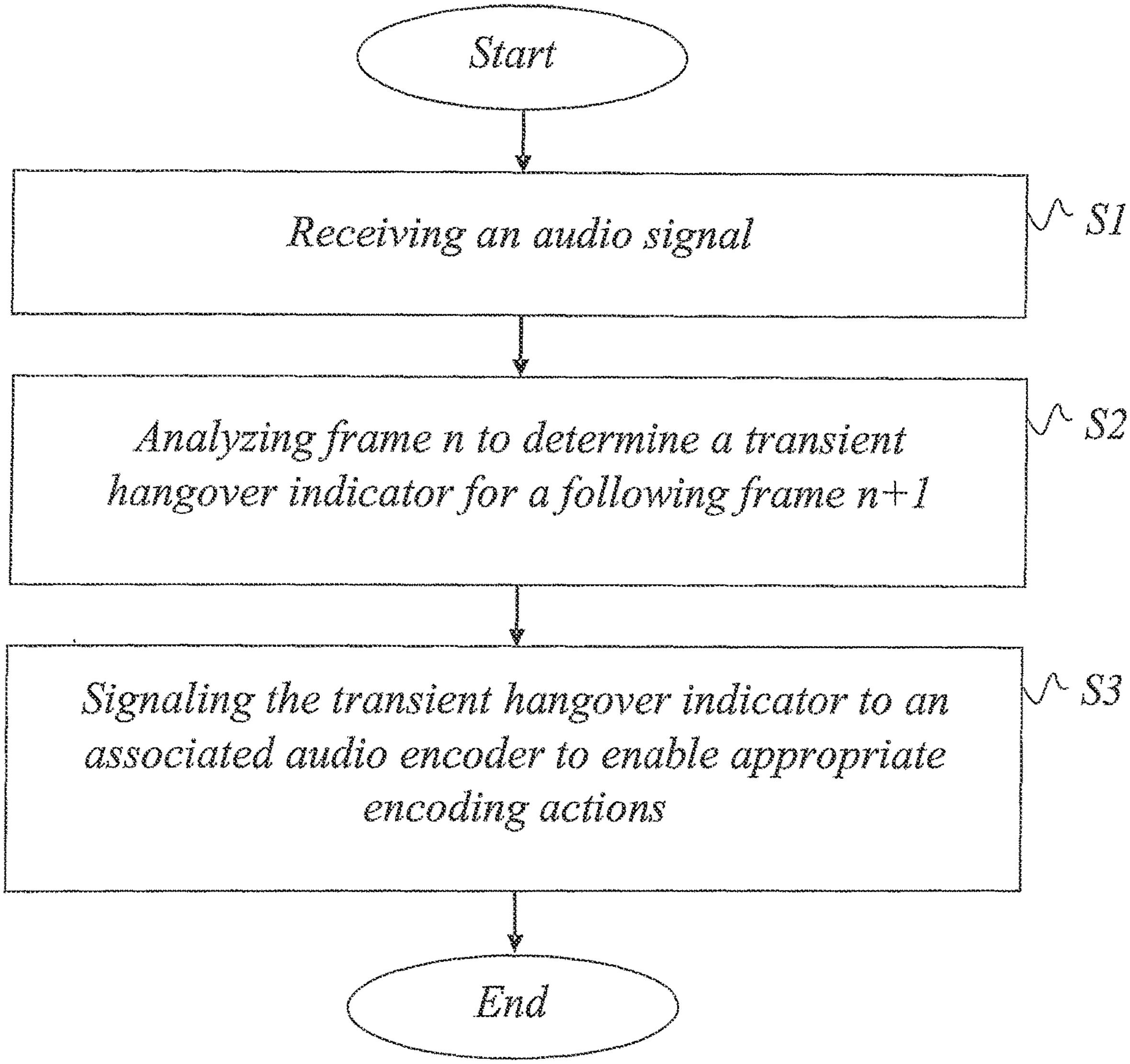
FIG. 4 is a schematic flow diagram of a method for supporting encoding of an audio signal according to an exemplary embodiment of the invention.

With reference to the exemplary schematic flow diagram of FIG. 4, improved support for efficient audio encoding can be summarized as follows:

In step S1, an audio signal is received. In step S2, a given frame n is analyzed to determine, based on audio signal characteristics of the given frame n, a transient hangover indicator for a following frame n+1. In step S3, the transient hangover indicator is signaled to an associated audio encoder to enable appropriate encoding actions with respect to the following frame n+1 of the audio signal.

As indicated above, the value of the transient hangover indicator is preferably determined in dependence on the existence of audio signal characteristics representative of a transient within the given input frame n that is being analyzed. The value of the hangover indicator may be expressed in many different ways, including True/False, 1/0, +1/−1 and a number of other equivalent representations.

For a better understanding of the invention, more detailed examples of signal analysis and detection mechanisms will now be described.

Block-Wise Energy Calculation

Figure 5:
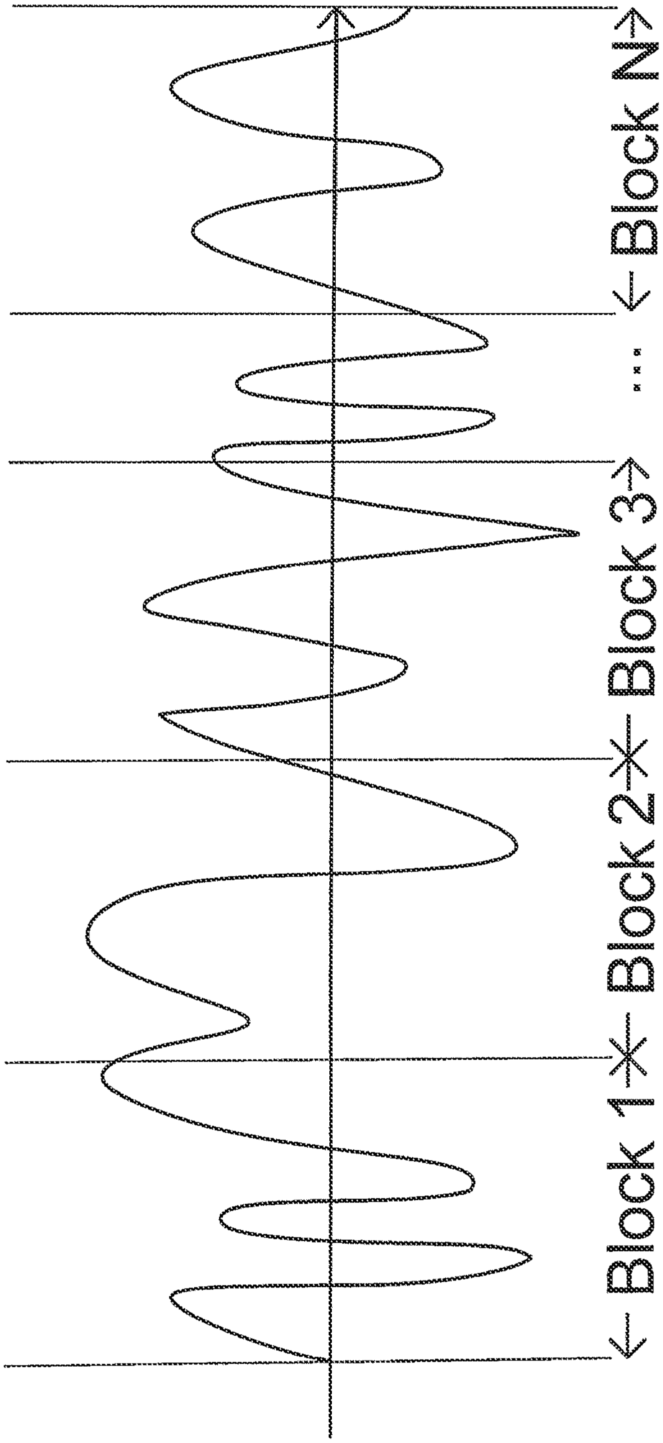
FIG. 5 is a schematic diagram illustrating an example of how a frame can be divided into blocks for power calculation purposes.

As an example, a transient detector may be based on the fluctuations in power in the audio signal. For instance the audio frame to be encoded can be divided in several blocks, as illustrated in FIG. 5. In each block, i, the short term power, $P_{ST}(i)$, is calculated.

A long term power, $P_{LT}(i)$ can be calculated by a simple IIR filter, $P_{LT}(i)=\alpha P_{LT}(i-1)+(1-\alpha)P_{ST}(i)$, where $\alpha$ is a forgetting factor.

When the quotient $P_{ST}(i)/P_{LT}(i)$ exceeds a certain threshold, the transient detector signals that a transient is found in block i.

Expressed in terms of energy; for each block, a comparison between the short term energy E(i) and the long term energy $E_{LT}(i)$ is performed. A transient can be considered as detected whenever the energy ratio is above a certain threshold:

$E(i) \geq RATIO \times E_{LT}(i)$, where RATIO (a.k.a., $\rho$) is an energy ratio threshold that may be set to some suitable value such as for example 7.8 dB.

This is merely an example of a detection measure, and the invention is not limited thereto.

High-Pass Filter and Zero-Crossings

Since the blocks of the audio frame are short, there is a risk that the transient detector above triggers on stationary signals where the fluctuations of a low frequency sine function appears to be rapid power changes.

Figure 6:
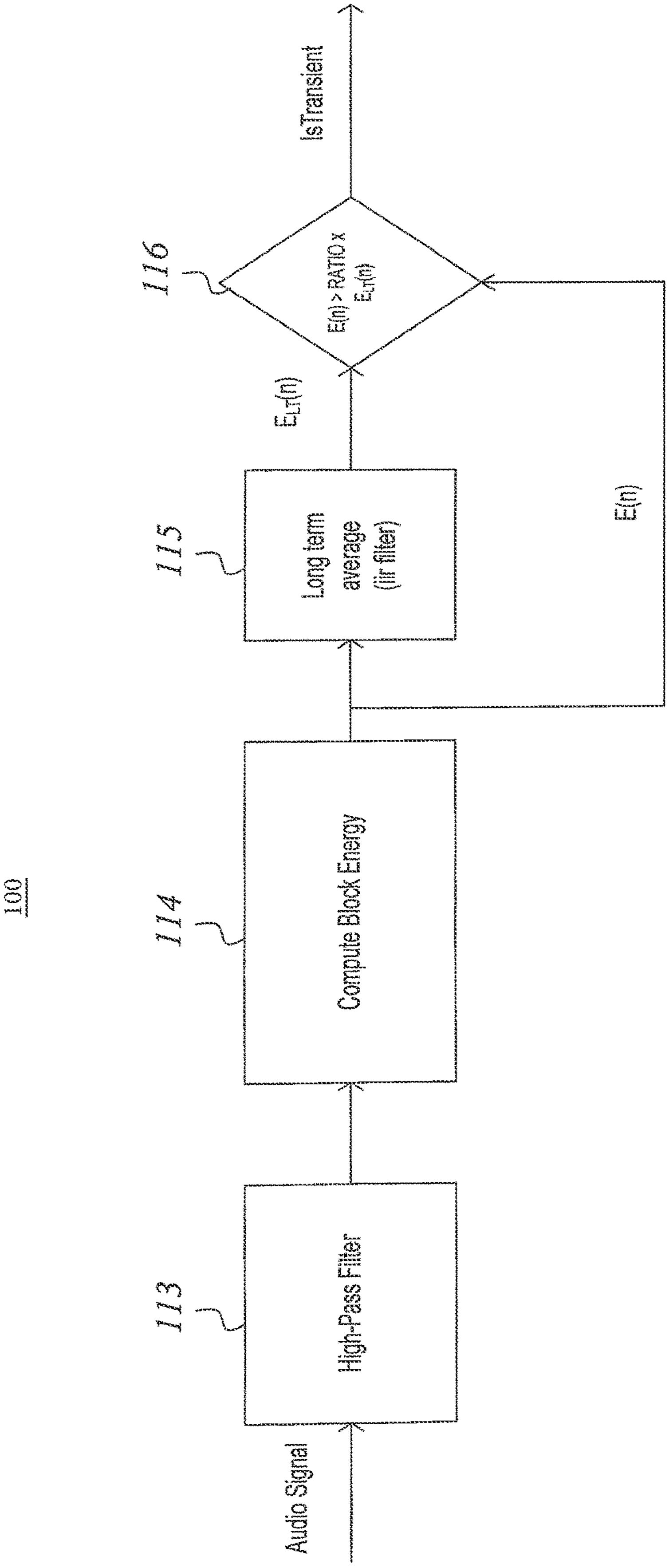
FIG. 6 is a schematic diagram illustrating an example of a transient detector with high-pass filtering.

This problem can be avoided by adding a high-pass filter prior to power calculation, as illustrated in the example of FIG. 6. The transient detector 100 of FIG. 6 comprises a high-pass filter 113, a block energy computation module 114, a long term average module 115 and a threshold comparison module 116 to provide an IsTransient indication for frame n. The high-pass filter 113 removes low frequencies resulting in a power calculation of only the higher frequencies.

Another possible solution to the problem above could be to calculate the number of zero-crossings in the analyzed block. If the number of zero crossings is low, it is assumed that the signal only contains low frequencies and the transient detector could decide to increase the threshold value or to consider the block as free of transients.

Figure 7:
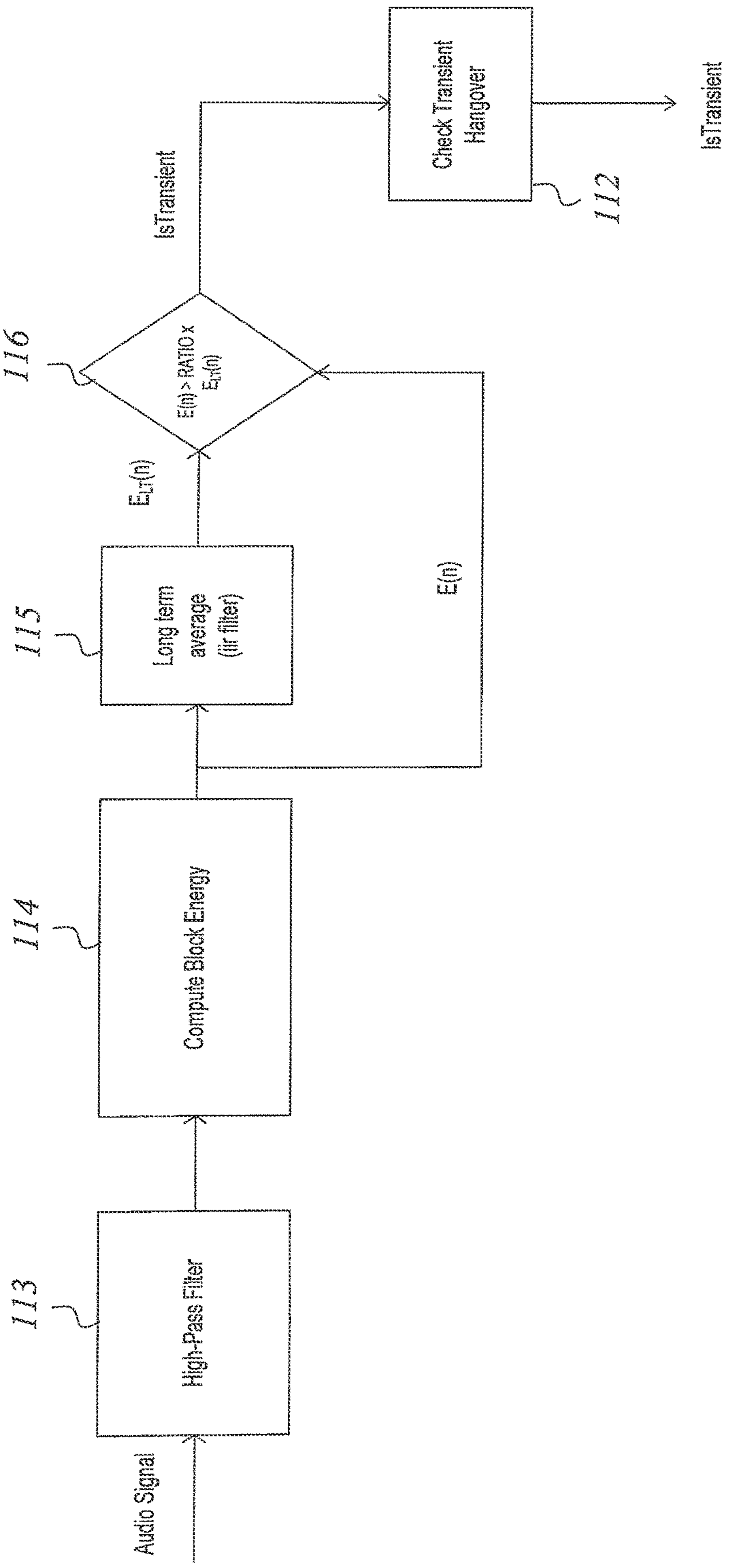
FIG. 7 is a schematic diagram illustrating an example of a transient detector with a transient hangover check according to an exemplary embodiment of the invention.

FIG. 7 is a schematic diagram illustrating an example of a transient detector with a transient hangover check according to an exemplary embodiment of the invention. The transient detector 100 of FIG. 7 comprises a high-pass filter 113, a block energy computation module 114, a long term average module 115, a threshold comparison module 116, and a module 112 for checking transient hangover to provide an IsTransient hangover indication for the following frame n+1.

Transient/Hangover Detection Dependent on Window-Function and/or Location

Optionally, the signal analyzer of the transient detector may be configured to determine the value of the transient hangover indicator not only in dependence on the existence of a transient but also in dependence on a predetermined window function and/or the location of the transient within the frame being analyzed.

Before transformation in the audio encoder, the audio signal is normally multiplied by a window function. In the case of codecs based on the Modified Discrete Cosine Transform (MDCT), the window function is often the so called sine window, but it could also be a Kaiser-Bessel window or some other window function.

The window functions generally have a maximum value at the beginning of the current frame and the end of the preceding frame, while the end of the current frame and the beginning of the preceding frame is close to zero.

This means that a transient near the end of the current frame will be suppressed by the window function and therefore less important to signal to the encoder. If the transient is suppressed enough it may even be beneficial to not signal to the encoder that a transient is detected.

However, when the next frame is to be encoded the transient will be in the end of the preceding frame, i.e. located near the maximum of the window function and it is essential that the encoder is signaled that a transient is detected.

A detected transient near the end of a frame should therefore result in a Hangover set to 1 (or equivalent representation) while no detected transient is signaled to the encoder. This way the transient detector signals that a transient is detected in the following frame.

Similarly, if a transient is detected in the beginning of a frame, the transient detector should signal that a transient is detected, but set the Hangover to 0 (or equivalent representation) since the transient will be suppressed by the window function when the next frame is encoded.

A transient located in the center of the frame will appear in both the current frame and the following frame. "Transient detected should therefore be signaled and Hangover set to 1.

TABLE 1

Decisions of Transient Detector depending on location of transient.

| Transient Detected in | Signal Transient | Hangover |
|---|---|---|
| Beginning of Frame | 1 | 0 |
| Center of Frame | 1 | 1 |
| End of Frame | 0 | 1 |

The exact borders between "Beginning of Frame", "Center of Frame" and "End of Frame" are preferably chosen with respect to the window function.

It should also be understood that the 1/0 representation of Table 1 are merely used as an example. In fact, any suitable representation including True/False and +1/−1 may be used for indicating hangover/not hangover. It is even possible to use non-binary representations such as probability indications.

In other words, the transient detector may be configured to determine a transient hangover indicator indicating a transient for the following frame n+1 if audio signal characteristics representative of a transient in frame n is detectable after a windowing operation based on a predetermined window function. The transient detector may also be configured to determine a hangover indicator that does not indicate a transient for the following frame n+1 if audio signal characteristics representative of a transient in frame n is suppressed after a windowing operation based on the window function. The window function generally corresponds to the window function (covering at least two frames) used for transform coding of frame n in the associated audio encoder, but shifted one frame forward in time, as will be explained below.

This invention introduces a decision logic which modifies a primary transient detection in order to adjust the decision to cope with overlapped frames. This is based on the fact that certain transients depending on the time occurrence do not need to be handled in a special way. For such cases the invention will override the primary decision and signal that there is no transient. In general the invention would modify the primary transient detection to adjust the decision based on the specific application.

Figure 8A:
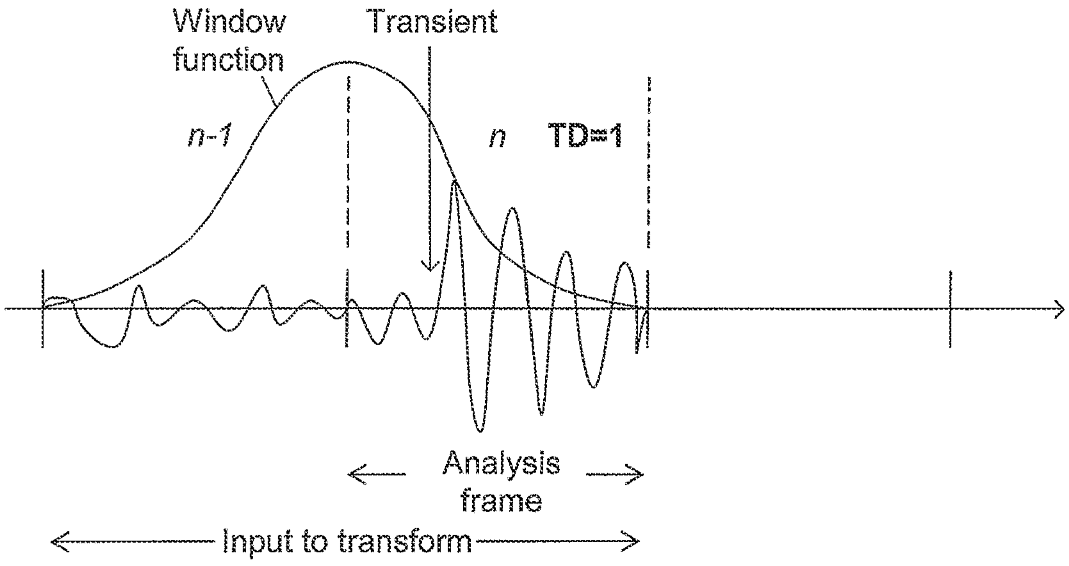
FIGS. 8A-B are schematic diagrams illustrating a first example of a transient and the effect of location of the transient and/or window function for the hangover indication according to an exemplary embodiment of the invention.
Figure 8B:
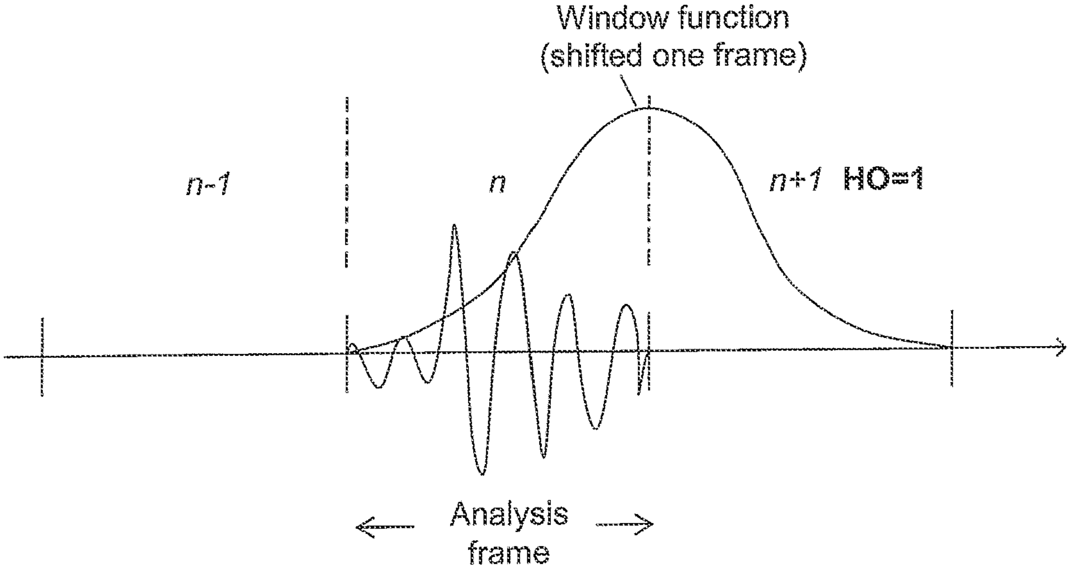

FIGS. 8A-B are schematic diagrams illustrating a first example of a transient and the effect of location of the transient and/or window function for the hangover indication according to an exemplary embodiment of the invention.

FIG. 8A shows frame n−1 and frame n used as input to the transform together with an exemplary window function used before the transform is applied. A transient is present in frame n (center of frame), and after a window operation using the selected window function, the transient is still detectable in this particular example. Hence the transient detection indicator TD is set to the value of 1.

For hangover indication purposes, frame n is used as the analysis frame, but the window function is shifted one frame forward as illustrated in FIG. 8B. In this particular example, the transient in frame n is also detectable after windowing by the shifted window function and therefore the hangover indication HO is set to the value of 1.

Figure 9A:
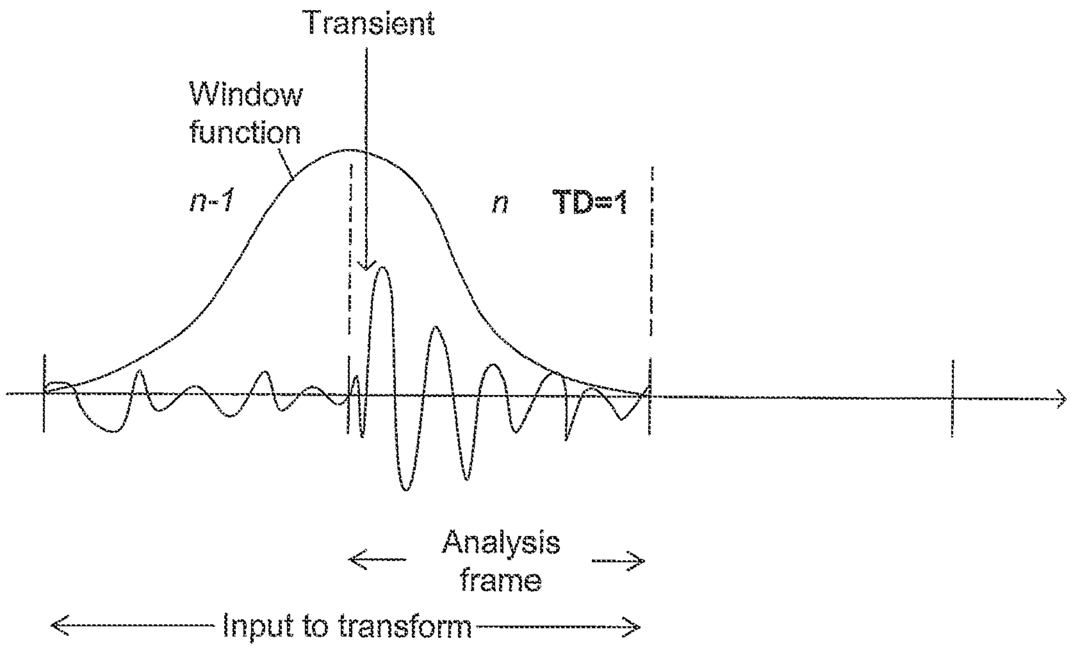
FIGS. 9A-B are schematic diagrams illustrating a second example of a transient and the effect of location of the transient and/or window function for the hangover indication according to an exemplary embodiment of the invention.
Figure 9B:
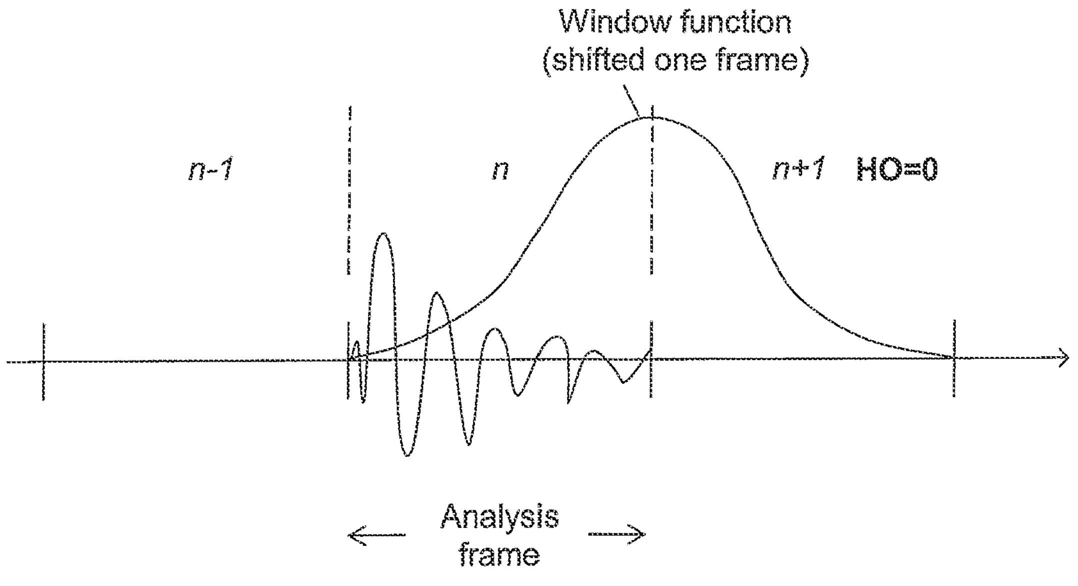

FIGS. 9A-B are schematic diagrams illustrating a second example of a transient and the effect of location of the transient and/or window function for the hangover indication according to an exemplary embodiment of the invention.

After a window operation using the selected window function, the transient in frame n (beginning of frame) is detectable in the example of FIG. 9A. Hence the transient detection indicator TD is set to the value of 1.

In the example of FIG. 9B, the transient in frame n is suppressed by the shifted window function and therefore the hangover indication HO is set to the value of 0.

Figure 10A:
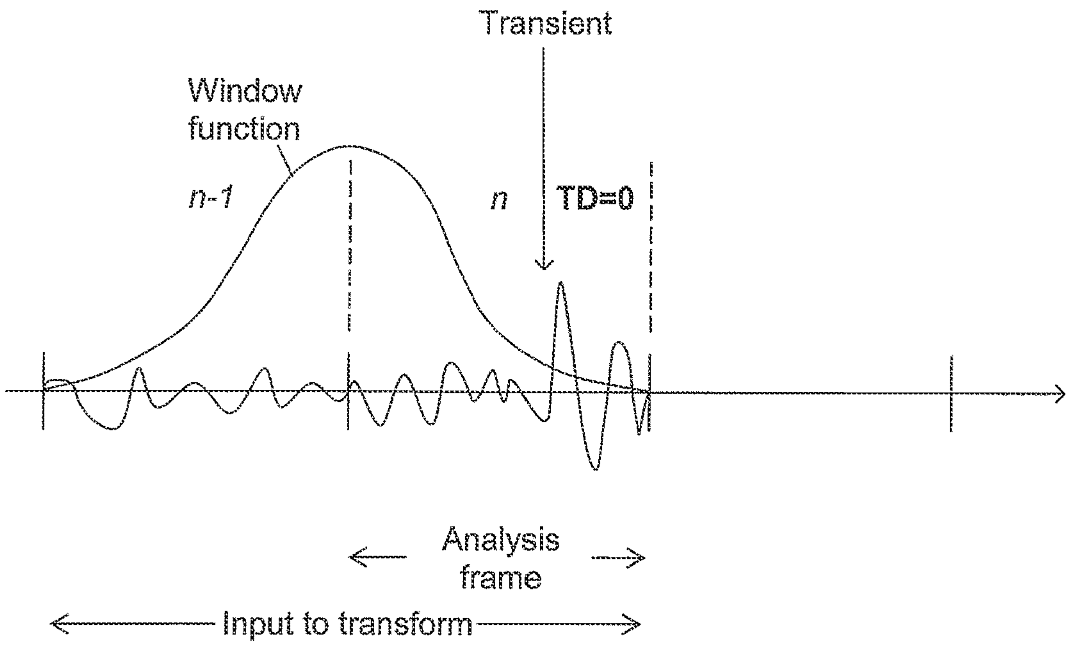
FIGS. 10A-B are schematic diagrams illustrating a third example of a transient and the effect of location of the transient and/or window function for the hangover indication according to an exemplary embodiment of the invention.
Figure 10B:
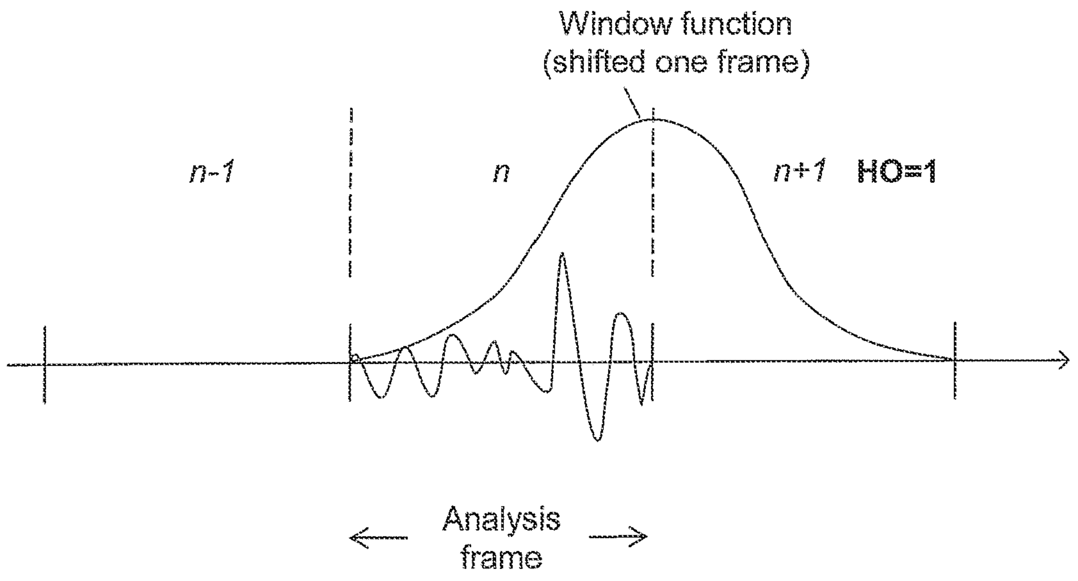

FIGS. 10A-B are schematic diagrams illustrating a third example of a transient and the effect of location of the transient and/or window function for the hangover indication according to an exemplary embodiment of the invention.

In the example of FIG. 10A, the transient in frame n (end of frame) is suppressed by the transform window function and therefore the transient detection indicator TD is set to 0.

As illustrated in the example of FIG. 10B, the transient in frame n is detectable after windowing by the shifted window function and therefore the hangover indication HO is set to 1.

The above concept could be improved by adapting the transient detection to the selected window function even further.

In an exemplary embodiment of the invention: before dividing the short-term energy with the long-term energy and comparing the quotient to the threshold, the short-term energy could be scaled by the window function at the current block. The long-term energy is still updated with the unscaled version of the short-term energy. If the scaled short-term energy divided by the long-term energy exceeds the threshold, the transient detector signals that a transient is detected.

Similarly the short-term energy is scaled by the window function at the position of the block shifted one frame length (the position of the block when the next frame is encoded). If the scaled short-term energy divided by the long-term energy exceeds the threshold, the transient detector sets Hangover to 1, otherwise 0.

In a preferred exemplary embodiment of the invention, the transient detector comprises means for scaling frame n by the selected window function to produce a first scaled frame, means for determining a transient indicator for frame n based on the first scaled frame, means for scaling frame n by the window function shifted one frameforward in time to produce a second scaled frame, and means for determining a transient hangover indicator for the following frame n+1 based on the second scaled frame.

In the following, the invention will be described in relation to a specific exemplary and non-limiting codec realization suitable for the "ITU-T G.722.1 fullband codec extension", now renamed ITU-T G.719 standard. In this particular example, the codec is presented as a low-complexity transform-based audio codec, which preferably operates at a sampling rate of 48 kHz and offers full audio bandwidth ranging from 20 Hz up to 20 kHz. The encoder processes input 16-bits linear PCM signals in frames of 20 ms and the codec has an overall delay of 40 ms. The coding algorithm is preferably based on transform coding with adaptive time-resolution, adaptive bit-allocation and low-complexity lattice vector quantization. In addition, the decoder may replace non-coded spectrum components by either signal adaptive noise-fill or bandwidth extension.

Figure 11:
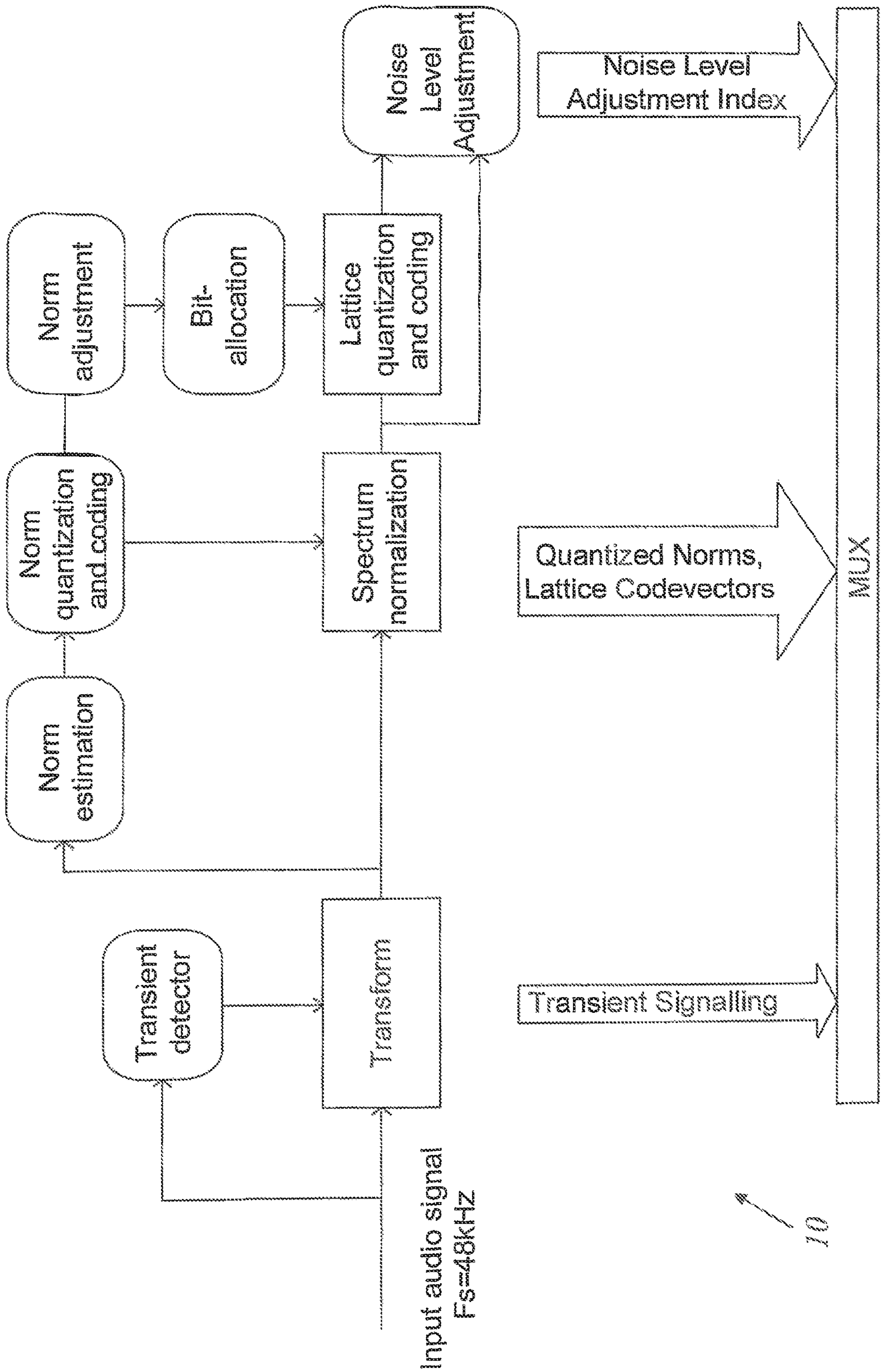
FIG. 11 is a block diagram of an exemplary encoder suitable for fullband extension.

FIG. 11 is a block diagram of an exemplary encoder suitable for fullband signals. The input signal sampled at 48 kHz is processed through a transient detector. Depending on the detection of a transient, a high frequency resolution or a low frequency resolution (high time resolution) transform is applied on the input signal frame. The adaptive transform is preferably based on a Modified Discrete Cosine Transform (MDCT) in case of stationary frames. For non-stationary frames a higher temporal resolution transform (based on time-domain aliasing and time segmentation) is used without a need for additional delay and with very little overhead in complexity. Non-stationary frames preferably have a temporal resolution equivalent to 5 ms frames (although any arbitrary resolution can be selected).

A transient detected at a certain frame will also trigger a transient at the next frame. The output of the transient detector is a flag, for example denoted IsTransient. The flag is set to the value 1 or the logical value TRUE or equivalent representation if a transient is detected, or set to the value 0 or the logical value FALSE or equivalent representation otherwise (if a transient is not detected).

It may be beneficial to group the obtained spectral coefficients into bands of unequal lengths. The norm of each band is estimated and the resulting spectral envelope consisting of the norms of all bands is quantized and encoded. The coefficients are then normalized by the quantized norms. The quantized norms are further adjusted based on adaptive spectral weighting and used as input for bit allocation. The normalized spectral coefficients are lattice vector quantized and encoded based on the allocated bits for each frequency band. The level of the non-coded spectral coefficients is estimated, coded and transmitted to the decoder. Huffman encoding is preferably applied to quantization indices for both the coded spectral coefficients as well as the encoded norms.

Figure 12:
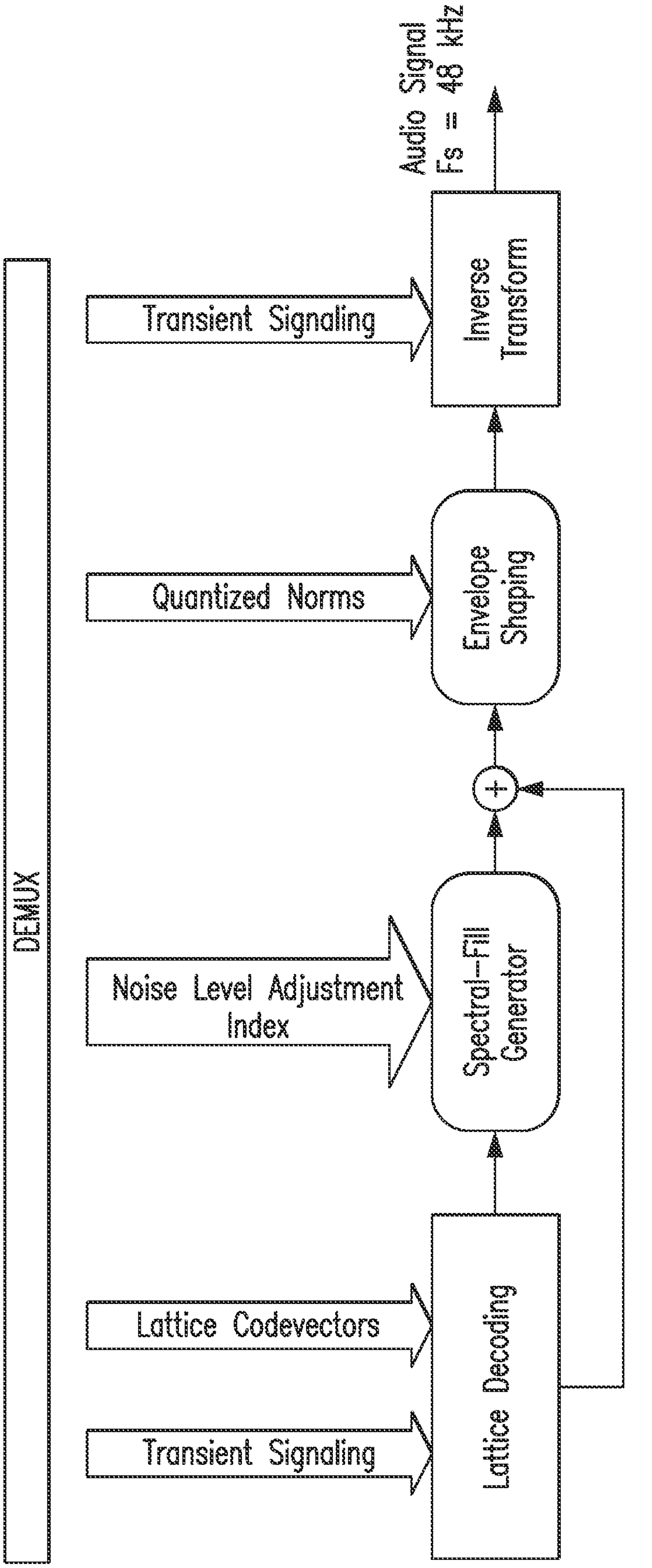
FIG. 12 is a block diagram of an exemplary decoder suitable for fullband extension.

FIG. 12 is a block diagram of an exemplary decoder suitable for fullband signals. The transient flag is first decoded which indicates the frame configuration, i.e. stationary or transient. The spectral envelope is decoded and the same, bit-exact, norm adjustments and bit-allocation algorithms are used at the decoder to re-compute the bit-allocation which is essential for decoding quantization indices of the normalized transform coefficients.

After de-quantization, low frequency non-coded spectral coefficients (allocated zero bits) are regenerated, preferably by using a spectral-fill codebook built from the received spectral coefficients (spectral coefficients with non-zero bit allocation).

Noise level adjustment index may be used to adjust the level of the regenerated coefficients. High frequency non-coded spectral coefficients are preferably regenerated using bandwidth extension.

The decoded spectral coefficients and regenerated spectral coefficients are mixed and lead to a normalized spectrum. The decoded spectral envelope is applied leading to the decoded full-band spectrum.

Finally, the inverse transform is applied to recover the time-domain decoded signal. This is preferably performed by applying either the inverse Modified Discrete Cosine Transform (IMDCT) for stationary modes, or the inverse of the higher temporal resolution transform for transient mode.

The algorithm adapted for fullband extension is based on adaptive transform-coding technology. It operates on 20 ms frames of input and output audio. Because the transform window (basis function length) is of 40 ms and a 50 percent overlap is used between successive input and output frames, the effective look-ahead buffer size is 20 ms. Hence, the overall algorithmic delay is of 40 ms which is the sum of the frame size plus the look-ahead size. All other additional delays experienced in use of an ITU-T G.719 codec are either due to computational and/or network transmission delays.

Advantages of the invention include low complexity, time domain computation (no spectrum computation required), and/or compatibility with lapped transforms based on the hangover value.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] ISO/IEC JTC/SC29/WG 11, CD 11172-3, "CODING OF MOVING PICTURES AND ASSOCIATED AUDIO FOR DIGITAL STORAGE MEDIA AT UP TO ABOUT 1.5 MBIT/s, Part 3 AUDIO", 1993.

[2] ISO/IEC 13818-7, "MPEG-2 Advanced Audio Coding, AAC", 1997.

The invention claimed is:

1. An audio encoder apparatus, comprising:

memory; and processing circuitry coupled to the memory, wherein the audio encoder apparatus is configured to perform an audio signal encoding process comprising:

determining a short term energy value (E(m)) for a sub-frame m of a given frame n of the audio signal;

determining a long term energy value ($E_{LT}(m)$) using a previously determined long term energy value ($E_{LT}(m-1)$), a predetermined factor ($\alpha$), and the short term energy value (E(m)), wherein $E_{LT}(m)=\alpha E(m)+(1-\alpha)E_{LT}(m-1)$;

using the short term energy value and the long term energy value to determine whether a transient hangover condition exists for a frame n+1 of the audio signal, wherein frame n+1 of the audio signal follows frame n of the audio signal; and signaling a transient hangover indicator for frame n+1 as a result determining that the transient hangover condition exists for frame n+1 of the audio signal.

2. An audio encoder apparatus, comprising:

memory; and processing circuitry coupled to the memory, wherein the audio encoder apparatus is configured to perform an audio signal encoding process comprising:

analyzing a given frame n of an audio signal comprising a plurality of frames including frame n and a frame n+1, wherein frame n of the audio signal comprises at least a first sub-frame and a second sub-frame, and frame n of the audio signal is immediately followed by frame n+1 of the audio signal, to determine whether a transient hangover condition is satisfied for frame n+1; and triggering a transient for frame n+1 as a result of determining that the transient hangover condition for frame n+1 is satisfied, wherein analyzing the given frame n of the audio signal to determine whether the transient hangover condition is satisfied for frame n+1 comprises:

i) determining a short term energy value for the first sub-frame of frame n(E(1)), ii) determining a long term energy value for the first sub-frame of frame $n(E_{LT}(1))$ using the short term energy value, a previously determined long term energy value $E_{LT}(0)$, and a predetermined factor ($\alpha$), wherein $E_{LT}(1)=\alpha E(1)+(1-\alpha)E_{LT}(0)$, and iii) determining whether $E(1)\geq R\times E_{LT}(1)$, where R is a predetermined energy ratio threshold, and the audio encoder apparatus is configured such that the audio encoder apparatus determines that a transient is present in frame n of the audio signal as a result of determining that E(1) is greater than $R\times E_{LT}(1)$.

3. The audio encoder apparatus of claim 2, wherein the analyzing further comprises determining whether audio signal characteristics representative of the transient in said given frame n is not suppressed after a windowing operation based on a window function.

4. The audio encoder apparatus of claim 3, wherein said window function corresponds to a function used for transform coding of frame n of said audio signal in said audio encoder apparatus, but shifted one frame forward in time.

5. The audio encoder apparatus of claim 4, wherein the audio encoder apparatus is further configured to encode the audio signal using a lapped transform.

6. The audio encoder apparatus of claim 3, wherein the audio encoder apparatus is further configured to:

scale said given frame n by said window function to produce a first scaled frame;

determine a transient indicator for said given frame n based on the first scaled frame;

scale said given frame n by said window function shifted one frame forward in time to produce a second scaled frame; and determine a transient hangover indicator for said following frame n+1 based on the second scaled frame.

7. The audio encoder apparatus of claim 2, wherein determining that the transient hangover condition is satisfied further comprises determining a location of the transient in said given frame n.

8. The audio encoder apparatus of claim 7, wherein determining that the transient hangover condition is satisfied further comprises determining that the transient in said given frame n is located at the center or end of frame n.

9. The audio encoder apparatus of claim 8, wherein determining that the transient hangover condition is satisfied further comprises determining whether the transient that is present in frame n is located at the beginning of frame n.

10. The audio encoder apparatus of claim 2, wherein the audio encoder apparatus is further configured to encode frame n+1 based on the triggering of the transient for frame n+1.

11. An audio encoding method, the method comprising:

obtaining a given frame n of an audio signal comprising a plurality of frames including frame n and a frame n+1, wherein frame n of the audio signal is immediately followed by frame n+1 of the audio signal;

determining that a transient hangover condition is satisfied for frame n+1; and triggering a transient for frame n+1 as a result of determining that the transient hangover condition for frame n+1 is satisfied, thereby enabling proper encoding of frame n+1, wherein determining that the transient hangover condition is satisfied for frame n+1 comprises:

determining a short term energy value (E(m)) for a sub-frame m of frame n;

computing a long term energy value ($E_{LT}(m)$) for the sub-frame m using a previously determined long term energy value $E_{LT}(m-1)$, a predetermined factor ($\alpha$), and the short term energy value, wherein $E_{LT}(m)=\alpha E(m)+(1-\alpha)E_{LT}(m-1)$; and determining that $E(m)\geq R\times E_{LT}(m)$, where R is a predetermined energy ratio threshold.

12. The method of claim 11, wherein determining that the transient hangover condition is satisfied further comprises determining a location of the transient in said given frame n.

13. A computer program product comprising a non-transitory computer readable medium storing software for configuring an audio encoder to perform the method of claim 11.

14. A transient detector, the transient detector comprising: memory; and processing circuitry, wherein the transient detector is configured to perform a process comprising:

for a sub-frame m−1 of a frame n of an audio signal, obtaining a long term energy value ($E_{LT}(m-1)$), wherein the frame n of the audio signal comprises an ordered set of M sub-frames, where m>1 and M>1;

for a sub-frame m of the frame n of the audio signal, determining a short term energy value (E(m));

for the sub-frame m of frame n of the audio signal, determining a long term energy value ($E_{LT}(m)$), wherein $E_{LT}(m)=\alpha\times E_{LT}(m-1)+(1-\alpha)\times E(m)$, where $\alpha$ is less than 1 and greater than or equal to 0;

based on E(m) and $E_{LT}(m)$, determining whether a transient hangover condition exists for a frame n+1 of the audio signal, wherein frame n+1 of the audio signal follows frame n of the audio signal; and signaling a transient hangover indicator as a result determining that the transient hangover condition exists for frame n+1 of the audio signal.

15. The transient detector of claim 14, wherein the transient detector is configured to determine, based on E(m) and $E_{LT}(m)$, whether the transient hangover condition exists for a frame n+1 of the audio signal by determining whether a ratio of E(m) and $E_{LT}(m)$ satisfies a condition.

16. A method for detecting a transient, the method comprising:

obtaining a long term energy value ($E_{LT}(m-1)$) for a given frame n of an audio signal, wherein the frame n of the audio signal comprises an ordered set of sub-frames, where m>1;

for a sub-frame m of the given frame n of the audio signal, determining a short term energy value (E(m));

for the sub-frame m, calculating a long term energy value ($E_{LT}(m)$) by computing a weighted average of $E_{LT}(m-1)$ and E(m), such that $E_{LT}(m)=\alpha\times E_{LT}(m-1)+(1-\alpha)\times E(m)$, where $\alpha$ is less than 1 and greater than or equal to 0;

based on E(m) and $E_{LT}(m)$, determine whether a transient hangover condition exists for a frame n+1 of the audio signal, wherein frame n+1 of the audio signal follows frame n of the audio signal; and as a result determining that the transient hangover condition exists for frame n+1 of the audio signal, signal a transient hangover indicator to an audio encoder to enable proper encoding of frame n+1.

17. The method of claim 16, wherein determining whether the transient hangover condition exists for a frame n+1 of the audio signal comprises determining whether a ratio of E(m) and $E_{LT}(m)$ satisfies a condition.

* * * * *